US009489321B2

(12) United States Patent
O'Connor et al.

(10) Patent No.: US 9,489,321 B2
(45) Date of Patent: Nov. 8, 2016

(54) SCHEDULING MEMORY ACCESSES USING AN EFFICIENT ROW BURST VALUE

(71) Applicant: Advanced Micro Devices, Inc., Sunnyvale, CA (US)

(72) Inventors: James M. O'Connor, Austin, TX (US); Niladrish Chatterjee, Salt Lake City, UT (US); Nuwan S. Jayasena, Sunnyvale, CA (US); Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 308 days.

(21) Appl. No.: 13/917,033

(22) Filed: Jun. 13, 2013

(65) Prior Publication Data

US 2014/0372711 A1 Dec. 18, 2014

(51) Int. Cl.
  *G06F 13/16* (2006.01)
(52) U.S. Cl.
  CPC ......... *G06F 13/1626* (2013.01); *G06F 13/161* (2013.01); *G06F 13/1694* (2013.01)
(58) Field of Classification Search
  None
  See application file for complete search history.

(56) References Cited

U.S. PATENT DOCUMENTS

| 4,729,093 | A | 3/1988 | Mothersole et al. |
| 5,454,107 | A | 9/1995 | Lehman et al. |
| 6,185,637 | B1 * | 2/2001 | Strongin et al. ............... 711/167 |
| 2009/0031314 | A1 * | 1/2009 | Moscibroda et al. ........ 718/102 |
| 2009/0248994 | A1 * | 10/2009 | Zheng et al. ................. 711/151 |
| 2013/0013866 | A1 * | 1/2013 | Hsu et al. ..................... 711/136 |

\* cited by examiner

*Primary Examiner* — Midys Rojas
*Assistant Examiner* — Jane Wei
(74) *Attorney, Agent, or Firm* — Polansky & Associates, P.L.L.C.; Paul J. Polansky

(57) ABSTRACT

A memory accessing agent includes a memory access generating circuit and a memory controller. The memory access generating circuit is adapted to generate multiple memory accesses in a first ordered arrangement. The memory controller is coupled to the memory access generating circuit and has an output port, for providing the multiple memory accesses to the output port in a second ordered arrangement based on the memory accesses and characteristics of an external memory. The memory controller determines the second ordered arrangement by calculating an efficient row burst value and interrupting multiple row-hit requests to schedule a row-miss request based on the efficient row burst value.

19 Claims, 3 Drawing Sheets

500

300

400

SCHEDULING MEMORY ACCESSES USING AN EFFICIENT ROW BURST VALUE

FIELD

This disclosure relates generally to data processing systems, and more specifically to memory accessing agents.

BACKGROUND

Consumers continue to demand complex functional circuits, with higher performance and lower cost, such as data processors, very large scale integrated circuits (VLSI), systems on chips (SoCs), central processing unit (CPU) cores, advanced processing units (APUs), graphics processing unit (GPU) cores, memory sub-systems, system controllers, and peripheral functions. At the same time, many of these functional circuits have diverse expectations when the computer system performs memory accesses, while executing application programs and other software programs. For example, a GPU typically generates a large number of memory accesses and expects high memory bandwidth, while a CPU typically generates fewer memory accesses and expects low-latency transactions.

A computer system generally includes at least one memory controller that schedules and manages accesses to the memory for multiple memory access generating circuits. Not only is it difficult for the memory controller to manage the demands of a particular functional circuit, it is even more difficult for the memory controller to manage the demands of several functional circuits generating concurrent memory accesses. System performance is degraded if the memory controller is not meeting the expectations of one or more of the functional circuits, and overall system performance is even further degraded if some of the functional circuits are "starving" for timely memory accesses.

Also, the memory controller has the responsibility to meet strict timing deadlines, generally complicating the memory controller's ability to balance the scheduling of high bandwidth memory accesses and low latency memory accesses. For example, the Joint Electron Devices Engineering Council (JEDEC) organization defines increasingly strict timing specifications for burst read operation and burst write operation, for double data rate (DDR) synchronous dynamic random access memory (SDRAM).

Figure 1:
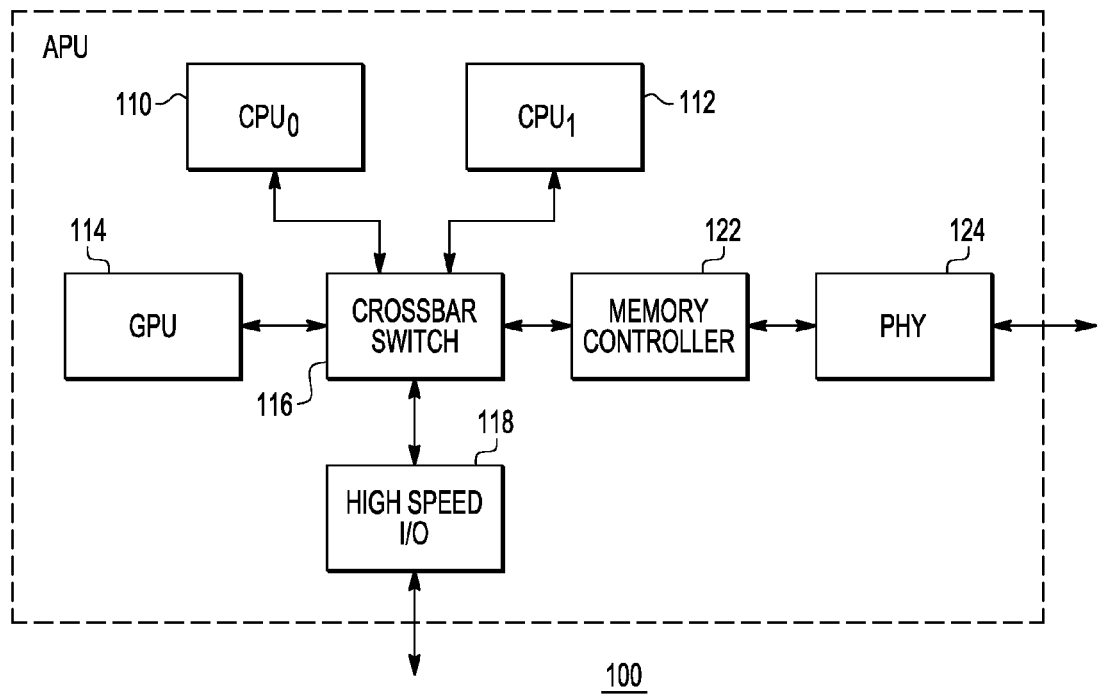
FIG. 1 illustrates in block diagram form a memory accessing agent according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory accessing agent as disclosed below includes a memory access generating circuit and a memory controller. The memory access generating circuit is adapted to generate multiple memory accesses in a first ordered arrangement. The memory controller is connected to the memory access generating circuit and has an output port, and provides the multiple memory accesses to the output port in a second ordered arrangement based on the memory accesses and characteristics of an external memory. The memory controller determines the second ordered arrangement based on an efficient row burst value, referred to as the MERB, and interrupts multiple row-hit requests to schedule a row-miss request based on the MERB.

In some embodiments, the memory controller calculates the MERB based on a specification of the memory, and the specification can include at least one of an ACTIVE to internal read or write delay time and a precharge delay time. In some embodiments, based on the MERB, the memory controller prioritizes the row-hit request in response to a type of the memory access generating circuit.

FIG. 1 illustrates in block diagram form a memory accessing agent 100 according to some embodiments. For the example shown in FIG. 1, memory accessing agent 100 is an APU, and generally includes a memory access generating circuit 110 that is a CPU core labeled "$CPU_0$", a memory access generating circuit 112 that is a CPU core labeled "$CPU_1$", a memory access generating circuit 114 that is a GPU core, a crossbar switch 116, a high-speed input/output (I/O) controller 118, a memory controller 122, and physical interface circuit labeled "PHY" 124 that has interface circuitry based on a physical layer protocol. In the example embodiment, memory controller 122 is a DRAM controller.

Each of CPU cores 110 and 112 and GPU core 114 is each connected to crossbar switch 116. Crossbar switch 116 is connected to high-speed I/O controller 118 and memory controller 122. Memory controller 122 is connected to PHY 124. PHY 124 is connected to a memory (not shown) that is external to memory accessing agent 100, such as DRAM memories conforming to JEDEC DDR versions such as 2, 3, or 4 (known as DDR2, DDR3, and DDR4).

In operation, each of CPU cores 110 and 112 and GPU core 114 has the capability to access memory to fetch and execute instructions corresponding to one or more programs and to access data associated with the instructions by generating memory accesses to crossbar switch 116. These memory access generating circuits each generate successive memory accesses to crossbar switch 116. Crossbar switch 116 switches and multiplexes the circuits of memory accessing agent 100 and their associated busses, including CPU cores 110 and 112, GPU core 114, and high-speed I/O controller 118. In particular, crossbar switch 116 provides the memory access requests to memory controller 122.

Memory controller 122 and PHY 124 access memory locations in the address space of external memory in response to memory access requests. For efficient utilization of the external memory, memory controller 122 dispatches memory accesses in a different order than the order received based on attributes of the memory accesses and characteristics of the external memory. Memory controller 122 further determines the second ordered arrangement based on an efficient row burst value, referred to as the MERB. For example, memory controller 122 selectively interrupts multiple "row-hit" requests to schedule a "row-miss" request based on the MERB. How memory controller 122 uses the MERB to implement a scheduling policy will be discussed in more detail below.

PHY 124 provides an interface for memory controller 122 to external memory. To access data, PHY 124 provides standard control signals, bank address (BA) signals, and address signals to external memory. In general, memory controller 122 responds to a read access request to control PHY 124 to read data from the selected address in external memory and responds to a write access request to control PHY 124 to write data to the selected address in memory.

Thus a memory access generating circuit, such as CPU cores 110 and 112 and GPU core 114, is adapted to generate multiple memory accesses in a first ordered arrangement, and a memory controller connected to the memory access generating circuits provides multiple memory accesses to a memory in a second ordered arrangement based on the memory accesses and characteristics of the external memory. The memory controller determines the second ordered arrangement by calculating the MERB and interrupting multiple row-hit requests to schedule a row-miss request based on the MERB.

Figure 2:
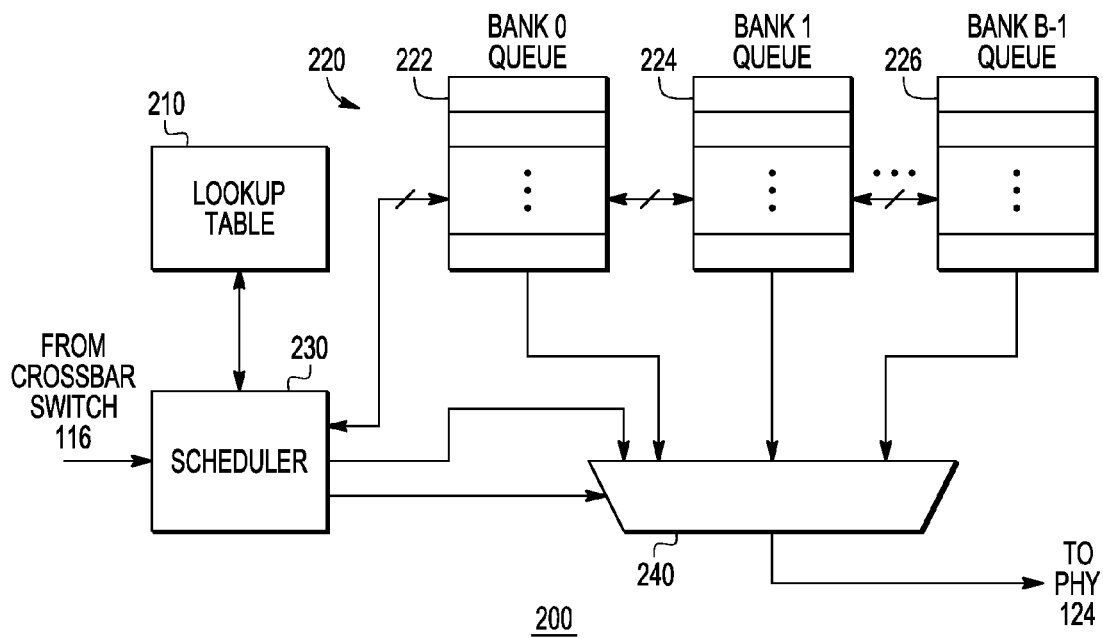
FIG. 2 illustrates in block diagram form a memory controller that may be used to implement the memory controller of FIG. 1 according to some embodiments.

FIG. 2 illustrates in block diagram form a memory controller 200 that may be used to implement memory controller 122 of FIG. 1 according to some embodiments. For the example shown in FIG. 2, memory controller 200 generally includes a lookup table 210, a queue 220, a scheduler 230, and a multiplexer 240. Queue 220 includes a set of bank queues that includes a representative bank 0 queue 222, a representative bank 1 queue 224, and a representative bank B−1 queue 226.

Lookup table 210 is connected to scheduler 230. Each sub-bank queue of queue 220 is connected to scheduler 230, and has a set of outputs. Scheduler 230 has a set of inputs to receive a set of signals from crossbar switch 116, and a control output. Multiplexer 240 has an input connected to an output of scheduler 230, and additional inputs connected to corresponding outputs of bank queues in queue 220, to corresponding three sets of outputs of each bank queue of queue 220, an input connected to the control output of scheduler 230, and an output to provide a set of signals to PHY 124.

In operation, memory controller 200 schedules accesses to memory received from one or more memory accessing agents. It receives access requests and places them in entries of bank queues corresponding to the banks of the access requests. Scheduler 230 scans access requests received at the inputs of queue 220, generates control information, and stores the control information in corresponding entries of the bank queue. It picks accesses according to its scheduling policy based in part on the control information. Each bank queue in queue 220 stores information about the access including the access address, data in the case of a write cycle, and the control information about the status of the access generated by scheduler 230. Scheduler 230 selects accesses from the bank queues for dispatch to PHY 124 by selecting the corresponding input of multiplexer 240. It also generates overhead commands including precharge and row activate commands.

Scheduler 230 implements a scheduling policy based on the relative priority of different memory accessing agents, such as higher-priority CPU cores (which expect low latency) and lower-priority GPU cores (which expect high bandwidth). Since different banks in memory can operate in parallel, the servicing of a row-miss request in one bank can be overlapped with (for example) the servicing of row-hit requests in other banks Scheduler 230 can also schedule received memory accesses in an order that reduces the effect of overhead cycles on memory bus utilization, such as activation and precharge cycles, based on the status of the access and the memory's timing specifications. For example, the JEDEC DDR3 standard defines timing specification "$t_{RCD}$" as the minimum time interval between a BANK ACTIVATE command and the start of a read or write command to the activated row, and "$t_{RP}$" as the PRECHARGE command period.

Note that when scheduler 230 schedules a row-hit request, the data is already in the selected memory's row buffer, so the memory need only perform a column access, i.e. a read or write command. When scheduler 230 schedules a row-miss request, however, the memory first performs a row access before it can perform a column access, providing the selected memory bank has already been precharged. If the selected memory bank has not been precharged, the memory circuitry also performs an additional precharge operation. Thus, when scheduler 230 performs consecutive accesses to different rows (or pages) of a memory, such as a DDR memory, in the same memory bank, it tends to operate less efficiently than if it performs consecutive accesses to the same memory page or to different memory banks.

Scheduler 230 generally prioritizes row-hit requests over row-miss requests, but occasionally schedules row-miss requests so it does not "starve" a particular memory access generating circuit. In particular, scheduler 230 uses the MERB to determine when to interrupt a series of row-hit requests with a row-miss request. In some embodiments, memory controller 200 calculates the MERB and stores it in lookup table 210. In other embodiments, a basic input/output system (BIOS) calculates the MERB and stores it in a model specific register for use by scheduler 230.

The MERB indicates the number of row-hit requests that must be scheduled to each of the other banks to overlap a row-miss request in one bank such that the bus utilization is not reduced. The MERB is based on a number of memory banks of the memory, B, a number of row-miss latency cycles, N, and a number of row-hit latency cycles, M. In a B-bank system with a row-miss latency of N cycles and a row-hit latency of M cycles, an efficient row burst value is calculated according to the following formula:

$$MERB = \frac{N}{M \times (B-1)} \quad [1]$$

Thus, MERB is inversely proportional to the number of memory banks. The value of MERB can be statically computed from the DRAM timing parameters, such as $t_{RCD}$ and $t_{RP}$. Once MERB row hits have been serviced from a bank, scheduler 230 can start servicing a row-miss request from that bank with little performance penalty, provided there are at least MERB requests pending for each of the other banks.

Figure 3:
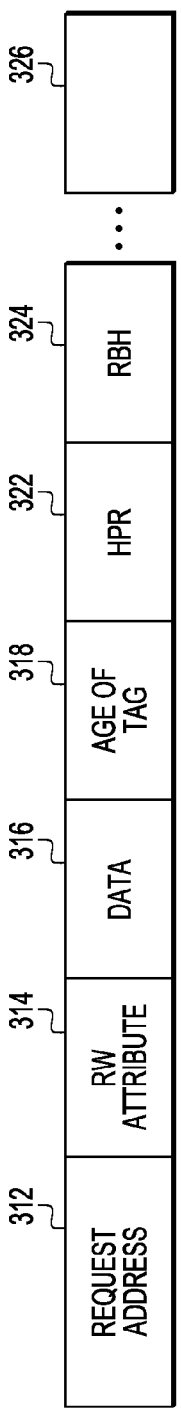
FIG. 3 illustrates in block diagram form a bank queue entry that may be used in the memory controller of FIG. 2 according to some embodiments.

FIG. 3 illustrates in block diagram form a bank queue entry 300 that may be used in memory controller 200 of FIG. 2 according to some embodiments. For the example shown in FIG. 3, bank queue entry 300 generally includes a request address field 312, a read write (RW) attribute field 314, a data field 316, and a set of corresponding access request type fields that includes an age of tag field 318, a highest priority access request (HPR) field 322, a row buffer hit field (RBH) field 324, and a set of additional access request type fields 326.

In one embodiment, the HPR field indicates whether the entry is the highest priority request for the bank, in which the highest priority request is the oldest request from a CPU core (or high priority client), if any, or if no CPU core request is pending, the oldest request from the GPU core (or low priority client). The RBH field indicates whether the entry is the oldest request from a CPU core (or high priority client) that would be a row hit, if any, or if not the oldest request from the GPU core (or low priority client) that would be a row hit. The age of tag field indicates the relative age of the entry. Scheduler 230 also maintains a count of the current number of requests for a given row for each bank.

On each cycle, if a given bank has not yet issued at least MERB number of requests to the currently-open row, and there are row-hit accesses for that bank, then scheduler 230 prefers the row-hit request. Otherwise, it prefers the highest priority request for that bank, indicated by the HPR field.

Scheduler 230 selects the bank with the highest-priority preferred RBH request. However this selection may depend on other conditions of the memory controller, such as the availability of resources such as empty slots in a read-request queue for issued read commands, which indicates that the RBH request can be issued without any timing concerns.

If after servicing MERB requests for a bank, scheduler 230 finds only one or only a few hit requests to that row remain pending, then it can schedule these before servicing a miss request. This function is referred to as "orphan control".

In some embodiments, the decision can be made based on the source of the requests, such as the CPU cores or the GPU core. For example, assuming MERB=4 requests, GPU core 114 may have 5 requests pending in a particular queue. Memory controller 200 issues 4 of these 5 requests when a higher-priority, latency sensitive CPU request arrives. Memory controller 200 may decide to close the row and proceed to service the CPU request despite the fact that only a single GPU core request remains. On the other hand, suppose the CPU core has 5 requests pending and 4 have already been issued when a GPU request is received. Memory controller 200 may instead choose to finish issuing the CPU core's fifth request before closing the row and proceeding to service the GPU request. In some embodiments, these decisions could be further based on specific core and/or process priorities.

In another embodiment, scheduler 230 may use a "MERB sum", which is equal to the MERB value times the total number of banks. The MERB sum represents the number of requests needed to keep the data bus busy to cover the activations of all of the banks Scheduler 230 monitors the total number of requests, and if this total is greater than or equal to the MERB sum, then scheduler 230 may choose to close an open row in a bank even if that bank had not yet issued at least MERB requests.

In some embodiments, memory controller 200 could use a different threshold than the MERB sum, such as the MERB sum multiplied by a constant less than one (because more requests may arrive which would keep the data bus busy).

In general, the policies described above assume there are MERB row-hit access requests in each bank. In some embodiments, this assumption can be relaxed. For example, if some banks have fewer than MERB pending row-hit access requests but other banks have more than MERB row-hit requests, then scheduler 230 may schedule additional row hits such that the average number of row hits serviced across all banks approaches MERB requests per bank, and thus still fully hides the overhead of the row miss being serviced. Alternatively, in cases where only a subset of banks have pending row-hit requests or only a subset of banks are being utilized (e.g. due to characteristics of application access patterns, such as strides), the MERB size may also be dynamically calculated to account for the reduced number of banks available to high row miss latencies.

Figure 4:
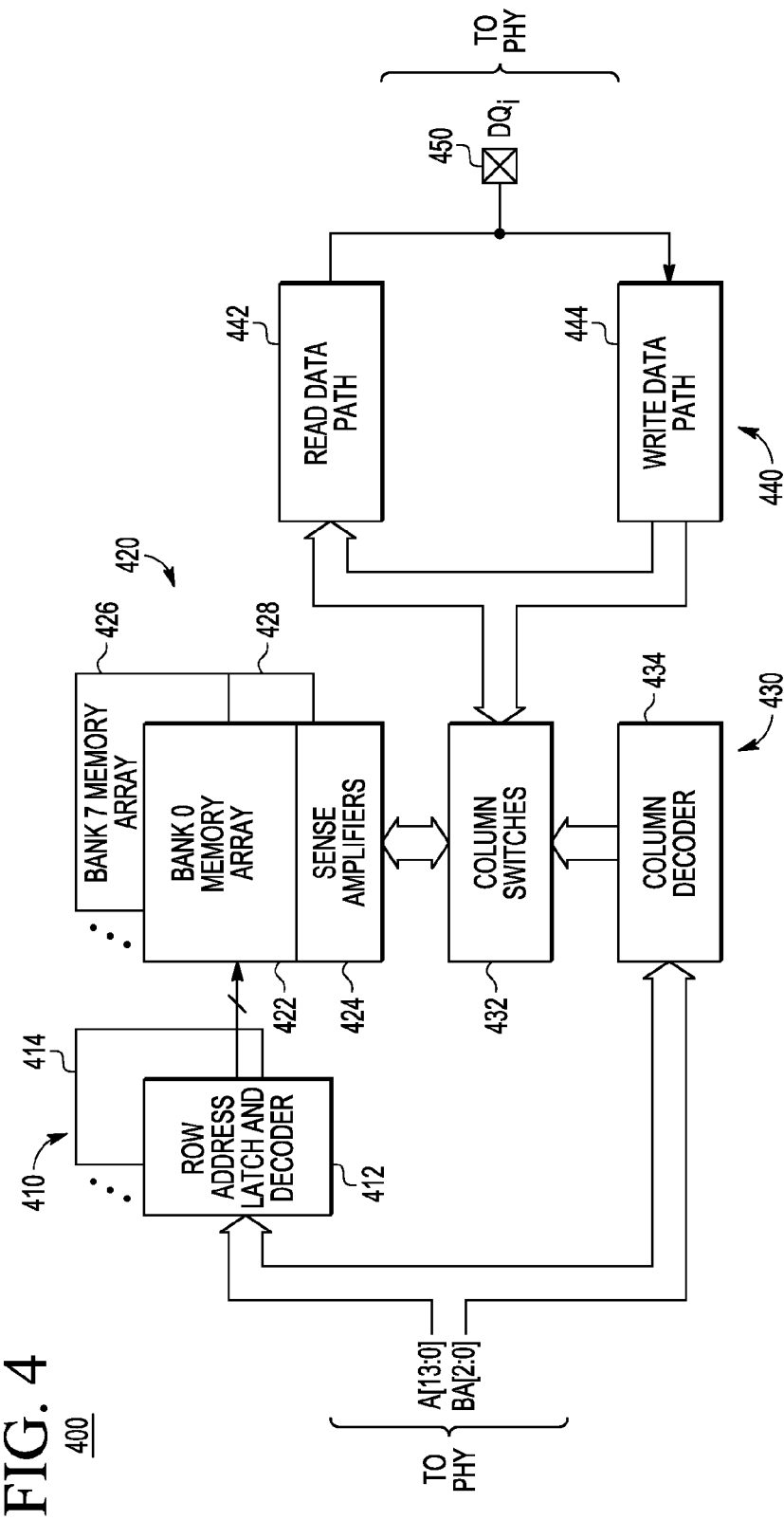
FIG. 4 illustrates in block diagram form an integrated circuit memory according to some embodiments.

FIG. 4 illustrates in block diagram form an integrated circuit memory 400 according to some embodiments. For the example shown in FIG. 4, memory 400 generally includes a row path 410, eight memory banks 420, a column circuit 430, a data path 440, and a representative one of a set of data pads 450 labeled "$DQ_i$".

Row path 410 includes a row address latch and decoder for each bank such as corresponding row address latch and decoder 412 for "BANK 0" and a corresponding row address latch and decoder 414 for "BANK 7". Row path 410 has a set of inputs connected to PHY 124 for receiving a representative row address labeled "A [13:0]" and a representative bank address labeled "BA [2:0]", and a set of outputs. The eight memory banks 420 include an associated memory array and a set of sense amplifiers such as memory array 422 and sense amplifiers 424 for BANK 0, and memory array 426 and sense amplifiers 428 for BANK 7. Each of the eight memory banks 420 has a set of inputs connected to the set of outputs of row path 410 for activating one of a set of word lines to its corresponding bank's memory array in response to signals A[13:0] and BA[2:0].

Column circuit 430 includes a set of column switches 432 and a column decoder 434. The set of column switches 432 are connected to the corresponding set of sense amplifiers of memory banks 420, and have a set of inputs. Column decoder 434 has a set of inputs connected to PHY 124 for receiving the set of signals A[13:0] and BA[2:0] for selecting a column address of one of the selected eight banks, and a set of outputs connected to the set of inputs of column switches 432.

Data path 440 includes a read data path 442 and a write data path 444. Read data path 442 has a set of inputs connected to column switches 432 and a set of outputs. Write data path 444 has a set of inputs, and a set of outputs connected to column switches 432. The set of data pads 450 are connected to the set of outputs of read data path 442, the set of inputs of write data path 444, and to PHY 124.

In operation, memory controller 200 provides a bank active command to activate a selected row of row path 410 in an idle memory bank of memory banks 420. Memory controller 200 initiates the bank active command by selectively activating and deactivating memory 400 control signals such as chip select, row address strobe (RAS) column address strobe (CAS), and write enable (WE), while also providing address signals A[13:0] and bank address signals BA[2:0] at the appropriate clock edge.

The selected bank of memory banks 420 transitions from its idle state, and decoders 412 through 414 latch and provide the selected row address to the selected memory arrays 422 through 426 of the selected bank. Sense amplifiers 424 through 428 sense data from the selected row and latch the data for use during a burst read or a burst write operation. Memory controller 200 issues burst read or burst write commands on the activated row after the appropriate timing delay. Note that memory controller 200 is able to activate a parallel memory bank, such as BANK 0, even when another memory bank, such as BANK 7 is active.

However, memory controller 200 is expected to meet timing delay specification tRRD to activate another bank, and memory controller 200 should not provide a row active command to a bank if that bank is already active.

Memory 400 provides selected memory data to PHY 124 over data pads 450 subsequent to memory controller 200 providing a read bank command to access burst read data in the activated row. Memory 400 provides the read data via column circuit 430 and read data path 442. Likewise, PHY 124 provides data over data pads 450 for storage in a selected memory location subsequent to memory controller 200 providing a write bank command to write burst write data to the activated row. Memory 400 provides the write data via column circuit 430 and write data path 444.

Typically, the memory system includes a multiple number of memory 400 circuits organized in a "rank". Memory controller 200 accesses each one of the multiple memory 400 circuits, by selecting particular memory banks in a rank. If memory controller 200 finds the requested data in a selected row-buffer (row-hit), memory controller 200 accesses the data by issuing a single "column-read command". If memory controller 200 does not find the requested data in a selected row-buffer (row-miss), memory controller 200 first provides a precharge command to close the existing open row in the row-buffer, next provides an activate command to fetch the selected row into the row buffer, and next provides a column-read command to read the selected column.

Figure 5:
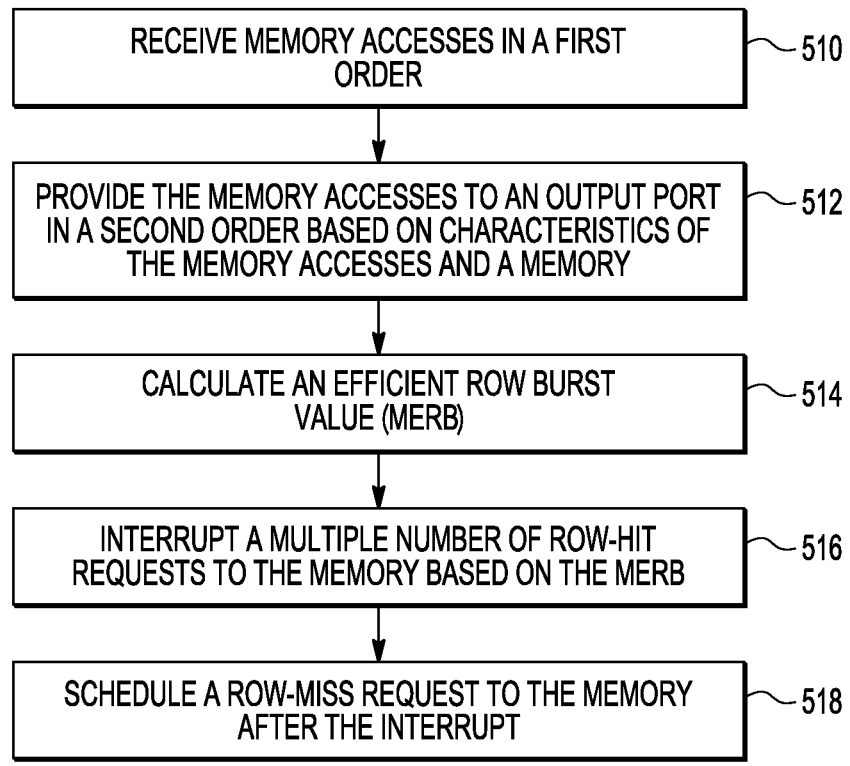
FIG. 5 illustrates a flow diagram of a method for efficiently accessing the integrated circuit memory of FIG. 4 according to some embodiments.

FIG. 5 illustrates a flow diagram of a method 500 for efficiently accessing memory 400 of FIG. 4 according to some embodiments. Action box 510 includes receiving memory accesses in a first order. Action box 512 includes providing the memory accesses to an output port in a second order based on characteristics of the memory accesses and a memory. Action box 514 includes calculating an efficient row burst value. Action box 516 includes interrupting a multiple number of row-hit requests to the memory based on the efficient row burst value. Action box 518 includes scheduling a row-miss request to the memory after interrupting the multiple number of row-hit requests of action box 516.

Some embodiments include further actions, for example, storing the efficient row burst value in a lookup table, storing a count of a number of requests sent to a row of a memory bank of the memory in a lookup table, storing an access request type corresponding to a respective memory bank of the memory in a lookup table, scheduling an access based on the access request type and the efficient row burst value, and scheduling the access based on at least one of an age of an access request, a high priority access request, and a row buffer hit access request.

Some embodiments include further actions such as scheduling a sequence of accesses including a multiple number of row-hit requests in a multiple number of memory banks of the memory and a row-miss request in another memory bank of the memory in response to the efficient row burst value, scheduling, based on the efficient row burst value, the row-miss request based on a number of a multiple number of memory banks of the memory having scheduled row-hit requests, calculating the efficient row burst value based on a number of a multiple number of memory banks of the memory, B, a number of row-miss latency cycles, N, and a number of row-hit latency cycles, M, and calculating the efficient row burst value based on a value multiplied by the number of the multiple number of memory banks of the memory.

Thus, a memory controller determines a second ordered arrangement of memory accesses by calculating an efficient row burst value and interrupting multiple row-hit requests to schedule a row-miss request based on the efficient row burst value. A memory accessing agent is adapted to dynamically modify the scheduling policy of the memory controller to achieve improved utilization of the memory bandwidth, while achieving a reduced memory turnaround time for applications that expect low-latency memory responses. The memory controller also keeps track of the amount of available work the memory access generating circuits, will perform that can be processed in parallel. The memory controller has the capability to selectively schedule low-latency requests while maintaining high bandwidth utilization of the memory.

The functions of memory accessing agent 100, memory controller 200, and bank queue entry 300 of FIGS. 1, 2, and 3 may be implemented with various combinations of hardware and software. For example, lookup table 210 and bank queue entry 300 may be determined by a basic input-output system (BIOS), an operating system, firmware, or software drivers, and stored as a table in non-volatile memory. Some of the software components may be stored in a computer readable storage medium for execution by at least one processor. Moreover the method illustrated in FIG. 5 may also be governed by instructions that are stored in a computer readable storage medium and that are executed by at least one processor. Each of the operations shown in FIG. 5 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of FIGS. 1, 2 and 3 may be described or represented by a computer accessible data structure in the form of a database or other data structure which can be read by a program and used, directly or indirectly, to fabricate integrated circuits with the circuits of FIGS. 1, 2, and 3. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIGS. 1, 2, and 3. The netlist may then be placed and routed to produce a data set describing geometric shapes to be applied to masks. The masks may then be used in various semiconductor fabrication steps to produce integrated circuits of FIGS. 1, 2, and 3. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiments, memory accessing agent 100 includes two CPU cores 110 and 112, and one GPU core 114. In some embodiments, memory accessing agent 100 could include a different number of CPU cores and/or GPU cores. CPU cores 110 and 112 and GPU core 114 could be other types of data processor cores than CPU cores or GPU cores, such as digital signal processor (DSP) cores, video processing cores, multi-media cores, display engines, rendering engines, and the like. CPU cores 110 and 112 could use a common circuit design or different circuit designs. Also, any combination of functional circuits, such as memory accessing agent 100, CPU cores 110 and 112, GPU core 114, crossbar switch 116, high-speed I/O controller 118, memory controller 122, and PHY 124 could be formed on a single integrated circuit or could be formed on multiple integrated circuits.

Any combination of memory controller 200 functional circuits, such as lookup table 210, queue 220, scheduler 230, multiplexer 240, and bank queue entry 300 could be integrated on a single semiconductor chip, or any combination of functional circuits could be on separate chips.

Memory 400 has been described above in the context of DRAM technology. However, memory 400 can be implemented with other memory technologies, for example static random access memory (SRAM), phase-change memory (PCM), resistive RAM technologies such as memristors and spin-torque transfer magnetic RAM (STT-MRAM), and Flash memory.

Queue 220 has been described as having equal sized sub-bank queues, bank 0 queue 222, bank 1 queue 224, and bank B−1 queue 226. In some embodiments, each sub-bank queue could be a different size, and for example, CPU cores 110 and 112 could use different size queues than GPU core 114.

Memory controller 200 has been described as including queue 220 for receiving and storing memory access requests. In some embodiments, a different structure could be used instead of queue 220. For example, scheduler 230 could use a cache instead of queue 220. Also, in some embodiments, memory accessing agent 100 could receive and store memory access requests in queue 220 in a different way. For example, scheduler 230 has been described as providing memory access requests to queue 220. Memory accessing agent 100 could bypass scheduler 230 and could multiplex access requests directly to queue 220.

Accordingly, it is intended by the appended claims to cover all modifications of the disclosed embodiments that fall within the scope of the disclosed embodiments.

What is claimed is:

1. A memory accessing agent comprising:
a memory access generating circuit adapted to generate a plurality of memory accesses in a first ordered arrangement; and
a memory controller coupled to said memory access generating circuit and having an output port, for providing said plurality of memory accesses to said output port in a second ordered arrangement based on said memory accesses and characteristics of an external memory, said memory controller determining said second ordered arrangement in response to an efficient row burst value, said efficient row burst value indicating a number of consecutive row-hit requests to be scheduled before a row-miss request is scheduled and is calculated from said characteristics of said external memory, and interrupting a plurality of row-hit requests to schedule a row-miss request based on said efficient row burst value.

2. The memory accessing agent of claim 1, wherein said specification comprises as lease one of an activation-to-activation time and an activation-to-precharge time.

3. The memory accessing agent of claim 1, wherein based on said efficient row burst value, said memory controller prioritizes said row-hit request in response to a type of said memory access generating circuit.

4. A memory controller comprising:
a scheduler for selecting memory access requests in an order in response to memory characteristics, said scheduler for interrupting a plurality of row-hit requests to schedule a row-miss request based on an efficient row burst value, said efficient row burst value indicating a number of consecutive row-hit requests to be scheduled before a row-miss request is scheduled and is calculated from said characteristics of said external memory; and
an output circuit coupled to said scheduler, adapted to be coupled to a memory, said output circuit adapted to access said memory.

5. The memory controller of claim 4 further comprising:
a lookup table coupled to said scheduler, wherein said scheduler calculates said efficient row burst value and stores said efficient row burst value in said lookup table after calculating said efficient row burst value.

6. The memory controller of claim 5 wherein said scheduler further stores a count of a number of requests sent to a row of a memory bank of said memory.

7. The memory controller of claim 4 further comprising:
a queue for receiving and storing memory access requests, wherein said scheduler selects said memory access requests from said queue in said order.

8. The memory controller of claim 7 wherein said queue stores memory access requests corresponding to a respective memory bank of said memory and an access request type.

9. The memory controller of claim 8 wherein said scheduler schedules a memory access request based on said efficient row burst value and said access request type.

10. The memory controller of claim 8 wherein said access request type comprises at least a selected one of an age of a memory access request, a highest priority access request, and a row buffer hit access request.

11. The memory controller of claim 4, wherein said scheduler is further adapted to schedule a sequence of accesses including a second plurality of row-hit requests in a plurality of memory banks of said memory and a second row-miss request in another memory bank of said memory in response to said efficient row burst value.

12. The memory controller of claim 4, wherein said scheduler is further adapted to schedule said row-miss request based on a number of a plurality of memory banks of said memory having scheduled row-hit requests.

13. The memory controller of claim 4, wherein said efficient row burst value is based on a number of a plurality of memory banks of said memory, B, a number of row-miss latency cycles, N, and a number of row-hit latency cycles, M.

14. The memory controller of claim 13, wherein said efficient row burst value is based on a value multiplied by said number of said plurality of memory banks of said memory.

15. A method comprising:
providing memory accesses to an output port in an order based on characteristics of said memory accesses, said output port adapted to be coupled to a memory;
calculating an efficient row burst value based on characteristics of said memory, said efficient row burst value indicating a number of consecutive row-hit requests to be scheduled before a row-miss request is scheduled;

interrupting a plurality of row-hit requests to said memory based on said efficient row burst value; and scheduling a row-miss request to said memory after said interrupting.

16. The method of claim 15 further comprising:

calculating said efficient row burst value; and storing said efficient row burst value in a lookup table.

17. The method of claim 16 wherein said calculating comprises calculating said efficient row burst value based on a number of a plurality of memory banks of said memory, B, a number of row-miss latency cycles, N, and a number of row-hit latency cycles, M.

18. The method of claim 17 wherein said calculating further comprises calculating said efficient row burst value is based on a value multiplied by said number of said plurality of memory banks of said memory.

19. The method of claim 15 further comprising:

scheduling an access based on an access request type and said efficient row burst value, said access request type comprising at least one of an age of an access request, a high priority access request, and a row buffer hit access request.

\* \* \* \* \*